US008470186B2

(12) United States Patent
Chen et al.

(10) Patent No.: US 8,470,186 B2
(45) Date of Patent: Jun. 25, 2013

(54) PERPENDICULAR WRITE HEAD WITH WRAP AROUND SHIELD AND CONFORMAL SIDE GAP

(75) Inventors: Yingjian Chen, Fremont, CA (US); Shiwen Huang, Fremont, CA (US); Fenglin Liu, Milpitas, CA (US); Kyusik Shin, Pleasanton, CA (US)

(73) Assignee: HGST Netherlands B.V., Amsterdam (NL)

( * ) Notice: Subject to any disclaimer, the term of this patent is extended or adjusted under 35 U.S.C. 154(b) by 289 days.

(21) Appl. No.: 12/954,458

(22) Filed: Nov. 24, 2010

(65) Prior Publication Data

US 2012/0125885 A1 May 24, 2012

(51) Int. Cl.
*B44C 1/22* (2006.01)
(52) U.S. Cl.
USPC ............. 216/22; 216/37; 216/67; 360/125.3; 360/125.03; 360/125.16; 360/125.02
(58) Field of Classification Search
USPC ................ 216/22, 37, 67; 360/125.3, 125.03, 360/125.16, 125.02
See application file for complete search history.

(56) References Cited

U.S. PATENT DOCUMENTS

| | | | |
|---|---|---|---|
| 6,501,619 B1 | 12/2002 | Sherrer et al. | |
| 6,989,972 B1 | 1/2006 | Stoev et al. | |
| 7,038,882 B2 | 5/2006 | Crue et al. | |
| 7,075,756 B1 | 7/2006 | Mallary et al. | |
| 7,140,095 B2 | 11/2006 | Matono | |
| 7,159,302 B2 | 1/2007 | Feldbaum et al. | |
| 7,251,878 B2 | 8/2007 | Le et al. | |
| 7,253,992 B2 | 8/2007 | Chen et al. | |
| 7,375,925 B2 | 5/2008 | Sasaki et al. | |
| 7,392,577 B2 | 7/2008 | Yazawa et al. | |
| 7,417,824 B2 | 8/2008 | Kameda | |
| 7,561,384 B2 | 7/2009 | Osugi et al. | |
| 7,623,324 B2 | 11/2009 | Honda et al. | |
| 2006/0187581 A1 | 8/2006 | Nara et al. | |
| 2006/0279882 A1 | 12/2006 | Honda et al. | |
| 2007/0217069 A1 | 9/2007 | Okada et al. | |
| 2007/0253117 A1 | 11/2007 | Takei et al. | |
| 2008/0112081 A1 | 5/2008 | Matono | |
| 2008/0155810 A1 | 7/2008 | Hong et al. | |
| 2008/0239567 A1 | 10/2008 | Sasaki et al. | |
| 2008/0239585 A1 | 10/2008 | Ousugi et al. | |
| 2008/0253035 A1 | 10/2008 | Han et al. | |
| 2008/0259498 A1 | 10/2008 | Lengsfield et al. | |
| 2008/0266710 A1 | 10/2008 | Kameda et al. | |
| 2008/0266724 A1 | 10/2008 | Yazawa et al. | |
| 2008/0278853 A1 | 11/2008 | Kameda et al. | |
| 2008/0278861 A1 | 11/2008 | Jiang et al. | |
| 2008/0278862 A1 | 11/2008 | Kameda et al. | |
| 2009/0002885 A1 | 1/2009 | Sin | |

(Continued)

FOREIGN PATENT DOCUMENTS

| | | | |
|---|---|---|---|
| JP | 2006147023 A | 6/2006 | |
| JP | 2009048719 A | 8/2009 | |

(Continued)

*Primary Examiner* — Duy Deo
*Assistant Examiner* — Maki Angadi
(74) *Attorney, Agent, or Firm* — Patterson & Sheridan, LLP

(57) ABSTRACT

A perpendicular write head having a wrap around shield and a conformal side gap. In fabricating the write head, the leading edge shield may be chemical mechanical polished down to a level that is substantially even with a chemical mechanical polishing stop layer. Because the leading edge shield and the chemical mechanical polishing stop layer are used as RIE stop for trench RIE, a fully conformal side shield may be formed with a LTE/LES.

20 Claims, 11 Drawing Sheets

U.S. PATENT DOCUMENTS

| | | |
|---|---|---|
| 2009/0122445 A1 | 5/2009 | Jiang et al. |
| 2009/0141406 A1 | 6/2009 | Sasaki et al. |
| 2009/0147410 A1 | 6/2009 | Jiang et al. |
| 2009/0152119 A1 | 6/2009 | Tachibana et al. |
| 2009/0154019 A1 | 6/2009 | Hsiao et al. |
| 2009/0244789 A1 | 10/2009 | Hong et al. |
| 2009/0266790 A1 | 10/2009 | Balamane et al. |
| 2009/0283205 A1 | 11/2009 | Miyazawa et al. |
| 2010/0024201 A1 | 2/2010 | Le et al. |

FOREIGN PATENT DOCUMENTS

| | | |
|---|---|---|
| JP | 2009187612 A | 8/2009 |
| JP | 2009199712 A | 9/2009 |
| JP | 2009224000 A | 10/2009 |
| JP | 2009238261 A | 10/2009 |
| JP | 2010033621 A | 2/2010 |
| JP | 2010061735 A | 3/2010 |

Figure 4C
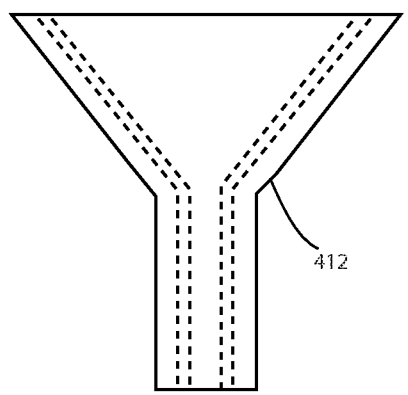
Figure 4D
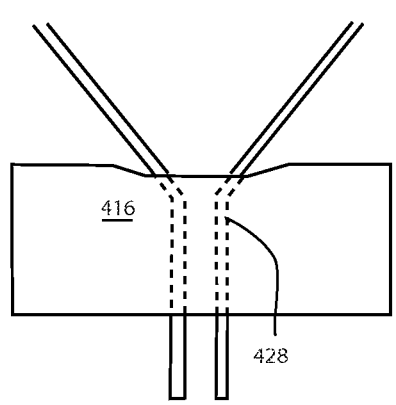
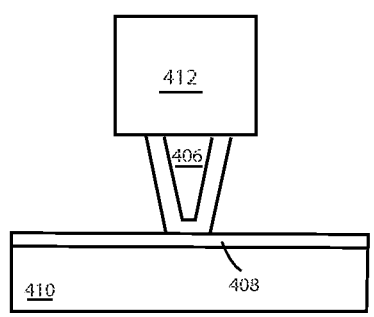
Figure 4K
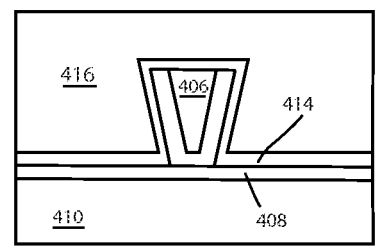
Figure 4L Figure 5A
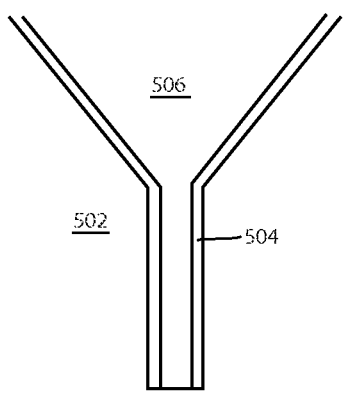
Figure 5B
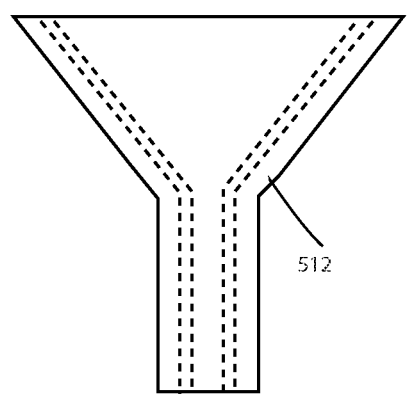
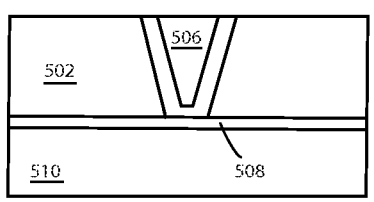
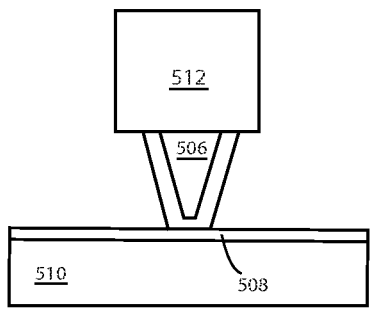
Figure 5I
Figure 5J Figure 5C
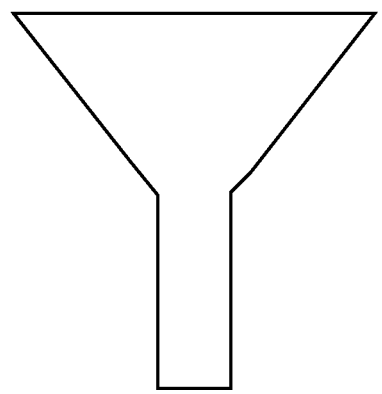
Figure 5D
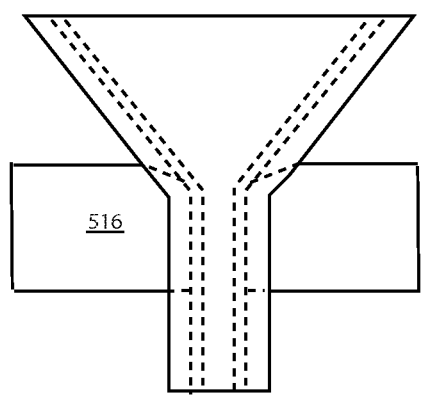
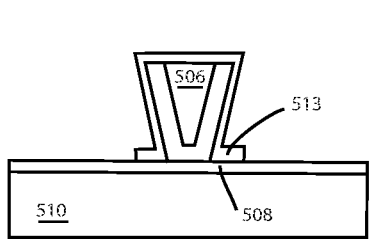
Figure 5K
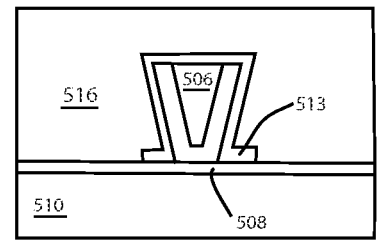
Figure 5L

PERPENDICULAR WRITE HEAD WITH WRAP AROUND SHIELD AND CONFORMAL SIDE GAP

BACKGROUND OF THE INVENTION

1. Field of the Invention

Embodiments of the present invention generally relate to a write head for use in a magnetic disk drive.

2. Description of the Related Art

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

In order to meet the ever increasing demand for improved data rate and data capacity, researchers have recently been focusing their efforts on the development of perpendicular recording systems. A traditional longitudinal recording system stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for sharper magnetic transitions, thereby reducing noise and increasing signal to noise ratio.

The market and competition continuously are pushing for higher recording area density, and higher area density necessitates the continuous improvement from write and read head performance. Wrap-around shield (WAS) heads have been used in HDD to meet the performance requirement of write heads (SNR and error rate). In the WAS head, the main pole is surrounded by shields from three sides from the ABS view. Another known solution to improve performance of perpendicular magnetic recording (PMR) heads is using a slanted pole on the trailing side of the writer. However, both of the solutions (the conventional WAS and the slanted write pole) start to show limitations in the current and future products.

Therefore, it is desirable to provide a perpendicular write head that has improved performance.

SUMMARY OF THE INVENTION

The present invention generally relates to a perpendicular write head having a wrap around shield and a conformal side gap. In fabricating the write head, the leading edge shield may be chemical mechanical polished down to a level that is substantially even with a chemical mechanical polishing stop layer. Because the leading edge shield and the chemical mechanical polishing stop layer are substantially planar, the gap layer may be conformally deposited.

In one embodiment, a method of manufacturing a write head is disclosed. The method includes chemical mechanical polishing a first leading edge shield layer to expose a chemical mechanical polishing stop layer, depositing a second leading edge shield layer over the first leading edge shield layer and the exposed chemical mechanical polishing stop layer, and removing at least a portion of the second leading edge shield layer to form a tapered second leading edge shield layer and to expose the chemical mechanical polishing stop layer.

In another embodiment, a method of manufacturing a write head is disclosed. The method includes forming a first insulating material over a substrate and depositing a chemical mechanical polishing stop layer over the substrate and the first insulating material. The method also includes depositing a first leading edge shield layer over the chemical mechanical polishing stop layer, chemical mechanical polishing the first leading edge shield layer to expose the chemical mechanical polishing stop layer, and depositing a second leading edge shield layer over the first leading edge shield layer and the exposed chemical mechanical polishing stop layer. The method additionally includes removing at least a portion of the second leading edge shield layer to form a tapered second leading edge shield layer and to expose the chemical mechanical polishing stop layer, depositing a second insulating layer over the chemical mechanical polishing stop layer and the second leading edge shield layer, and chemical mechanical polishing the second insulating layer.

In another embodiment, a method of manufacturing a write head is disclosed. The method includes depositing a first magnetic layer over a substrate, patterning the first magnetic layer to expose the substrate, and depositing a first insulating material over the exposed substrate and the first magnetic layer. The method also includes chemical mechanical polishing the first insulating material to expose the first magnetic layer, removing at least a portion of the first magnetic layer to expose the substrate, depositing a chemical mechanical polishing stop layer over the substrate and the first insulating material, and depositing a first leading edge shield layer over the chemical mechanical polishing stop layer. The method additionally includes chemical mechanical polishing the first leading edge shield layer to expose the chemical mechanical polishing stop layer, depositing a second leading edge shield layer over the first leading edge shield layer and the exposed chemical mechanical polishing stop layer, forming a resist mask over the second leading edge shield layer, and milling the second leading edge shield layer to form a tapered second leading edge shield layer and to expose the chemical mechanical polishing stop layer. The method also includes removing the resist mask, depositing a second insulating layer over the chemical mechanical polishing stop layer and the second leading edge shield layer, and chemical mechanical polishing the second insulating layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 4A-4H are schematic top views of a write head at various states of production.

FIGS. 4I-4P are schematic cross sectional views of FIGS. 4A-4H respectively.

FIGS. 5A-5H are schematic top views of a write head at various states of production according to another embodiment.

FIGS. 5I-5P are schematic cross sectional views of FIGS. 4A-4H respectively.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention generally relates to a perpendicular write head having a wrap around shield and a conformal side gap. In fabricating the write head, the leading edge shield may be chemical mechanical polished down to a level that is substantially even with a chemical mechanical polishing stop layer. Because the leading edge shield and the chemical mechanical polishing stop layer are substantially planar, the gap layer may be conformally deposited.

The embodiments disclosed herein include designs and methods of making damascene based high density perpendicular magnetic recording heads with leading edge shields (LES), leading edge taper (LET), self-aligned conformal side gap, and low magnetic flux density (Bs) side shields. The embodiments disclosed herein enables conformal side gap below (80 nm) nm (which is preferred for high density heads over 750 Gbits/in$^2$) in damascene based four sided wrap around shield writers. The conformal side shield is magnetically connected with leading edge shield and will improve the bit error rate (BER) and minimize adjacent track interference (ATI) in the high performance recording heads. Part of LES (or LES' in certain embodiments) works as a reactive ion etch (RIE) stop and enables a complete four-sided WAS without footing. A CMP stop (for example, Ru or Ir) fabricated at LES process also works as RIE stop together with LES' for trench RIE.

Figure 1A:
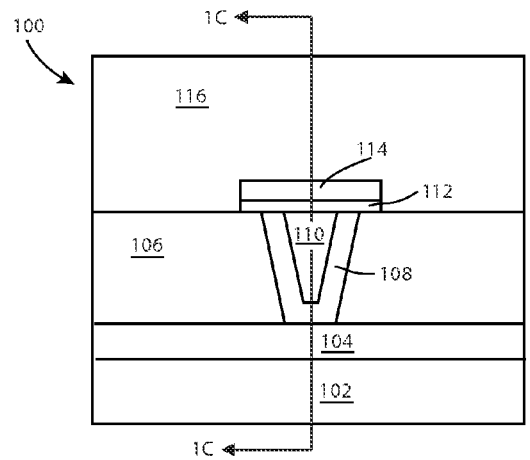
FIG. 1A is a cross sectional view of a write head 100 according to one embodiment.

FIG. 1A is a cross sectional view of a write head 100 according to one embodiment. The write head comprises a first leading edge shield layer 102. In one embodiment, the first leading edge shield layer 102 may comprise a ferromagnetic material. In another embodiment, the first leading edge shield layer 102 may comprise an alloy of nickel and iron such as NiFe$_{20}$. Over the first leading edge shield layer 102, a second leading edge shield layer 104 may be deposited. In one embodiment, the second leading edge shield layer 104 may comprise a ferromagnetic material. In another embodiment, the second leading edge shield layer 104 may comprise an alloy of nickel and iron such as NiFe$_{20}$. As shown in FIG. 1C, the second leading edge shield layer 104 will be tapered. During fabrication, part of the first leading edge shield layer 102 acts as an RIE stop layer to enable complete four-sided WAS without footing or disconnection between leading edge shield and side shield.

Over the second leading edge shield layer 104, a side shield 106 is formed. In one embodiment, the side shield layer 106 may comprise a ferromagnetic material. In another embodiment, the side shield layer 106 may comprise an alloy of nickel and iron such as NiFe$_{30}$. In another embodiment, the side shield layer 106 may have a higher magnetic moment than both the first and second leading edge shield layers 102, 104. The side shield layer 106 may be etched to form a trench. Within the trench, the side gap layer 108 is formed. In one embodiment, the side gap layer 108 may comprise ruthenium. In another embodiment, the side gap layer 108 may comprise a non-magnetic material. In another embodiment, the side gap layer 108 may comprise iridium. In one embodiment, the side gap layer 108 may have a thickness of between about 50 nm to about 100 nm.

Within the side gap layer 108, a magnetic layer 110 is deposited. In one embodiment, the magnetic layer 110 may comprise a ferromagnetic material selected from the group consisting of nickel, cobalt, iron, and combinations thereof. Over the magnetic layer 110 and side shield 106, a write gap layer 112 may be formed. In one embodiment, the write gap layer 112 may comprise a non-magnetic material. In another embodiment, the write gap layer 112 may comprise alumina. In another embodiment, the write gap layer 112 may comprise nickel-chromium. In one embodiment, the write gap layer 112 may have a thickness of between about 20 nm to about 25 nm. Over the write gap layer 112, a high Bs seed layer 114 may be deposited. In one embodiment, the high Bs seed layer 114 may comprise cobalt, nickel, iron, or combinations thereof. In one embodiment, the high Bs seed layer 114 may comprise CoNiFe. In one embodiment, the high Bs seed layer 114 may comprise a high magnetic moment material. In one embodiment, the high Bs seed layer 114 may have a magnetic flux density of between about 2.0 Tesla and about 2.4 Tesla. Over the side shield 106 and the high Bs seed 114, a trailing shield layer 116 may be deposited. In one embodiment, the trailing shield layer 116 may have a magnetic flux density of between about 1.5 Tesla and about 1.8 Tesla. In another embodiment, the trailing shield layer 116 may comprise a ferromagnetic material. In another embodiment, the trailing shield layer 116 may be selected from $NiFe_{45}$, $NiFe_{55}$, or other magnetic material having a higher magnetic moment. While not shown, a seed layer having substantially the same composition as the trailing edge shield layer 116 may be deposited prior to depositing the trailing edge shield layer 116.

Figure 1B:
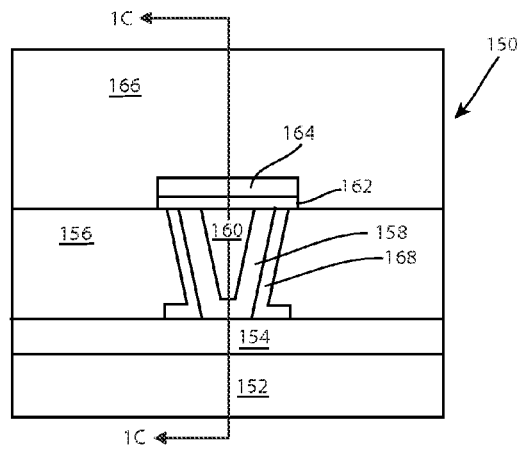
FIG. 1B is a cross sectional view of a write head 150 according to another embodiment.
Figure 1C:
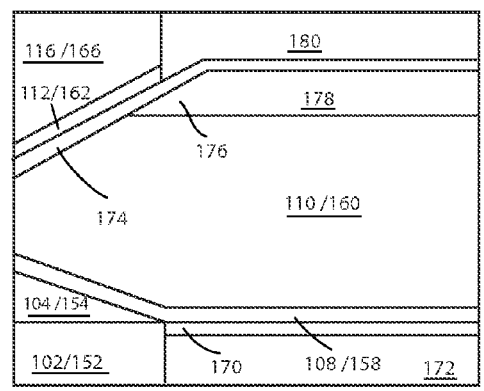
FIG. 1C is a cross sectional view of a write head according to another embodiment.

FIG. 1B is a cross sectional view of a write head 150 according to another embodiment. The write head 150 of FIG. 1B includes layers, materials, and properties similar to FIG. 1A. In particular, write head 150 includes a first leading edge shield layer 152, a second leading edge shield layer 154, a side shield 156, a write gap layer 162, a high Bs seed layer 164, a trailing shield 166, a magnetic layer 160, and a side gap layer 158. However, write head 150 also includes a seed layer 168. The use of both the seed layer 168 and the side gap layer 158 collectively can be used to control the thickness of the side gap. Part of the first leading edge shield layer 152 will function as a RIE stop layer and enable complete four-sided WAS without footing.

FIG. 1C is a cross sectional view of FIGS. 1A and 1B. The write head of FIG. 1C is the cross-sectional view for the write heads of FIGS. 1A and 1B. As shown in FIG. 1C, the second leading edge shield layer 104/154 is tapered. The first leading edge shield layer 102/152 is adjacent an insulating layer 172. In one embodiment, the insulating layer 172 may comprise alumina. Over the insulating layer 172, an RIE stop layer 170 is deposited. The write gap layer and the side gap layer are both tapered to form a tapered pole 174. The cap 178 is also tapered 176. In one embodiment, the cap 178 may comprise tantalum. In another embodiment, the cap 178 may comprise ruthenium. In another embodiment, the cap 178 may comprise a multi-layer stack of tantalum/ruthenium/tantalum. In another embodiment, the cap 178 may comprise an alloy of tantalum and ruthenium. Over the cap 178, a second insulating layer 180 may be deposited. In one embodiment, the second insulating layer 180 may comprise alumina. The design of FIGS. 1A-1C permits independent control of the side shield thickness. In FIG. 1A, the side gap layer is conformal and the side shield 106 is fully connected with the leading edge shield. In FIG. 1B, the side gap layer is composed of the side gap layer 158 and seed layer 168.

Figure 2A:
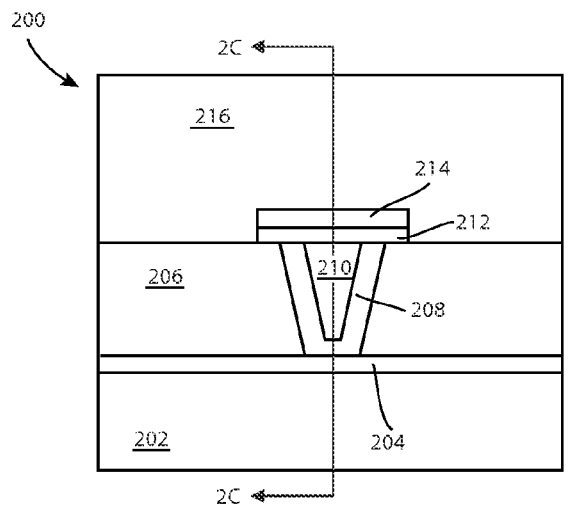
FIG. 2A is a cross sectional view of a write head 200 according to one embodiment.

FIG. 2A is a cross sectional view of a write head 200 according to one embodiment. The write head 200 of FIG. 2A includes layers, materials, and properties similar to FIG. 1A. However, the write head 200 of FIG. 2A has neither a first nor a second leading edge shield. Rather, the write head 200 has an insulating substrate 202. In one embodiment, the insulating substrate 202 may comprise alumina. The write head 200 also includes a RIE stop layer 204. In one embodiment, the RIE stop layer 204 includes ruthenium, NiCr, or Ru/NiCr. The RIE stop layer 204 and the insulating substrate 202 are substantially planar and not tapered. The write head 200 also includes a side shield 206, a write gap layer 212, a high Bs seed layer 214, a trailing shield 216, a magnetic layer 210, and a side gap layer 258.

Figure 2B:
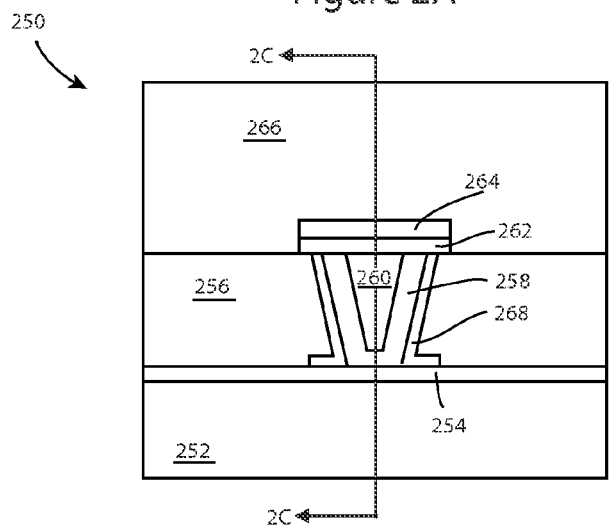
FIG. 2B is a cross sectional view of a write head 250 according to another embodiment.

FIG. 2B is a cross sectional view of a write head 250 according to another embodiment. The write head 250 of FIG. 2B includes layers, materials, and properties similar to FIG. 2A. In particular, write head 250 includes an insulating substrate 252, a RIE stop layer 254, a side shield 256, a write gap layer 262, a high Bs seed layer 264, a trailing shield 266, a magnetic layer 260, and a side gap layer 258. However, write head 250 also includes a seed layer 268 that is deposited in the trench before depositing the side gap layer 258. The use of both the seed layer 268 and the side gap layer 258 collectively can be used to control the thickness of the side gap.

Figure 2C:
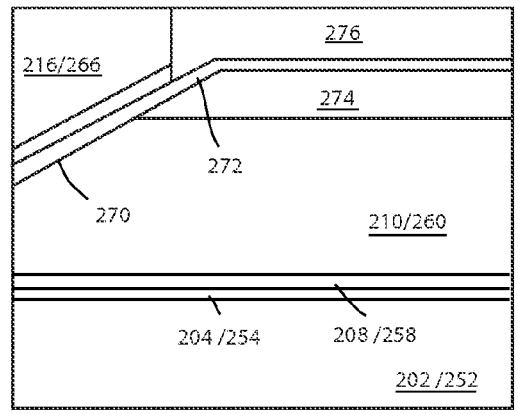
FIG. 2C is a cross sectional view of a write head according to another embodiment.

FIG. 2C is a cross sectional view of a write head according to another embodiment. The write head of FIG. 2C is the cross-sectional view for the write heads of FIGS. 2A and 2B. As shown in FIG. 2C, the insulating substrate 202/252, the RIE stop layer 204/254, and the side gap layer 208/258 are not tapered. The write gap layer is tapered to form a tapered pole 270. The cap 274 is also tapered 272. In one embodiment, the cap 274 may comprise tantalum. In another embodiment, the cap 274 may comprise ruthenium. In another embodiment, the cap 274 may comprise a multi-layer stack of tantalum/ruthenium/tantalum. In another embodiment, the cap 274 may comprise an alloy of tantalum and ruthenium. A second insulating layer 276 may be deposited over the cap 274. In one embodiment, the second insulating layer 276 may comprise alumina.

Figure 3A:
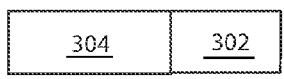
FIGS. 3A-3F are schematic cross sectional views of a write head at various stages of production.
Figure 3B:
Figure 3C:
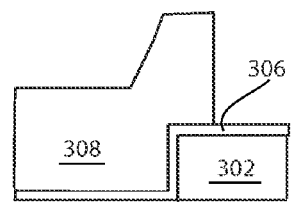
Figure 3D:
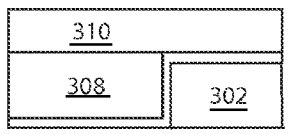
Figure 3E:
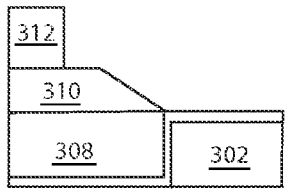
Figure 3F:
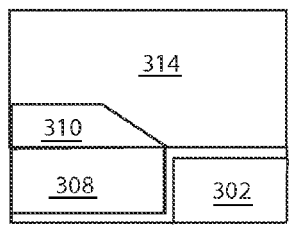

FIGS. 3A-3F are schematic cross sectional views of a write head at various stages of production. As shown in FIG. 3A, a sacrificial masking layer 304 is deposited over a substrate. In one embodiment, the sacrificial masking layer 304 may comprise a ferromagnetic material, such as NiFe. The sacrificial masking layer 304 may be deposited by conventional deposition processes such as electro chemical plating. The sacrificial masking layer 304 is then patterned. The patterning may occur by depositing a hard mask thereover and milling the exposed sacrificial masking layer 304. Alternatively, a photoresist mask may be formed over the sacrificial masking layer 304 and the exposed sacrificial masking layer 304 may be removed to expose at least a portion of the substrate. After a portion of the sacrificial masking layer 304 is removed, an insulating layer 302 may be deposited over the substrate and the sacrificial masking layer 304. The insulating layer 302 may be deposited by a blanket deposition process so that it deposited not only over the substrate, but also over the sacrificial masking layer 304. The insulating layer 302 may then be polished to remove the insulating layer 302 that overlies the sacrificial masking layer 304. The polishing may occur by CMP. The sacrificial masking layer 304 functions as a CMP stop layer during the polishing of the insulating layer 302. A CMP stop layer may also be added to enhance the CMP uniformity of the leading edge shield to be deposited. Following the polishing of the insulating layer 302, the sacrificial masking layer 304 may then be removed. In one embodiment, the sacrificial masking layer 304 may be removed by a wet etching process.

Once the sacrificial masking layer 304 has been removed, a CMP stop layer 306 may be deposited. In one embodiment, the CMP stop layer 306 may comprise a non-magnetic material. In another embodiment, the CMP stop layer 306 may comprise iridium. In another embodiment, the CMP stop layer 306 may comprise ruthenium. In one embodiment, the CMP stop layer 306 may be deposited by atomic layer deposition or physical vapor deposition. Over the CMP stop layer 306, a first leading edge shield layer 308 may be deposited. In one embodiment, the first leading edge shield layer 308 may be deposited by electroplating. In one embodiment, the first leading edge shield layer 308 may comprise one or more of iron, nickel, cobalt, and combinations thereof such as CoNiFe, NiFe or NiFe$_{20}$. In one embodiment, the first leading edge shield layer may have a magnetic flux density of between about 1.0 Tesla and about 2.0 Tesla. The first leading edge shield layer 308 may be deposited by placing a hard mask over the CMP stop layer 306 and then electroplating the first leading edge shield layer 308 over the exposed portions of the CMP stop layer 306. The hard mask may then be removed. The vertical edge of the first leading edge shield layer 308 and the CMP stop layer 306 determines the leading edge shield thickness. In one embodiment, the first heading edge shield layer 308 may have a thickness of between about 100 nm and about 500 nm. Both the CMP stop layer 306 and the first leading edge shield layer 308 will serve as a RIE stop during the trench RIE process.

The first leading edge shield layer 308 may then be planarized using the CMP stop layer 306 as the stopping point for the CMP process. After the CMP process, the first leading edge shield layer 308 and the CMP stop layer 306 are substantially planar. A second leading edge shield layer 310 may then be deposited over the first leading edge shield layer 308 as well as the CMP stop layer 306. The second leading edge shield layer 310 may be selected from the same materials as the first leading edge shield layer 308. However, the second leading edge shield layer 310 and the first leading edge shield layer 308 may be different. The second leading edge shield layer 310 will serve as a RIE stop in the leading edge taper region.

A leading edge tapering mill is performed to taper the second leading edge shield layer 310. A resist mask 312 is formed over the second leading edge shield layer 310 to define the areas of the second leading edge shield layer 310 that are to be milled. The taper portion of the second leading edge shield layer 310 will be the base for the leading edge taper in the main pole. Following the tapering, the resist 312 may be stripped and an insulating layer 314 may be deposited and planarized. In one embodiment, the insulating layer 314 may comprise alumina. The insulating layer 314 will be the base material of the damascene trench. The second leading edge shield layer 310 and the CMP stop layer 306 will be used as the RIE stop layers for the insulating layer 314 trench formation. The second leading edge shield layer 310 will be the RIE stop near the pole tip area and the CMP stop layer 306 will be the RIE stop near the yoke area.

Figure 4A:
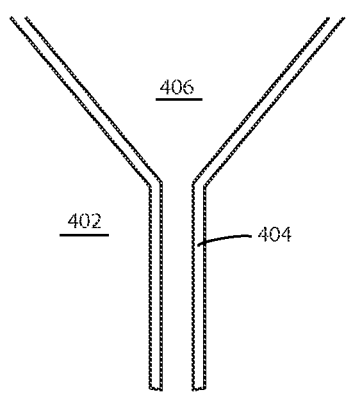
Figure 4B:
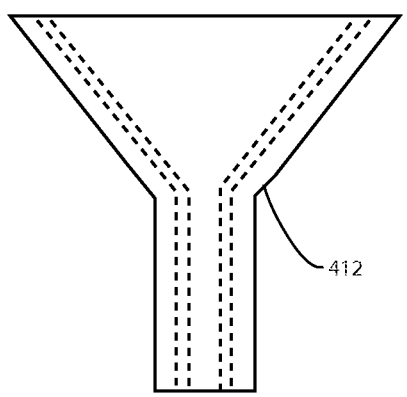
Figure 4I:
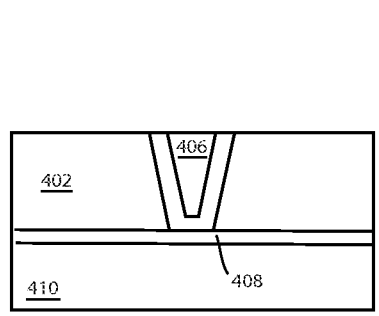
Figure 4J:
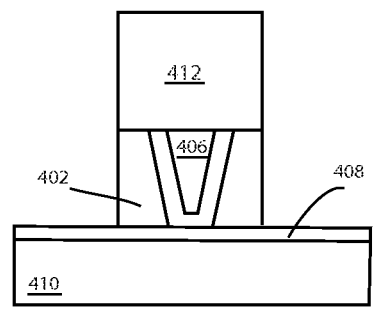
Figure 4E:
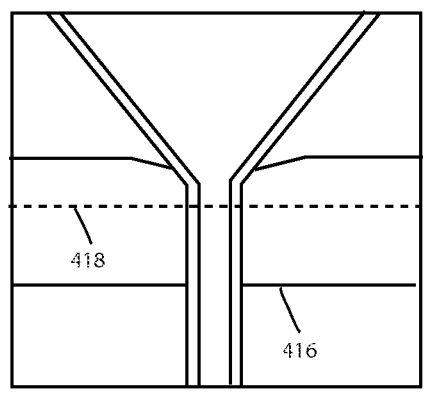
Figure 4F:
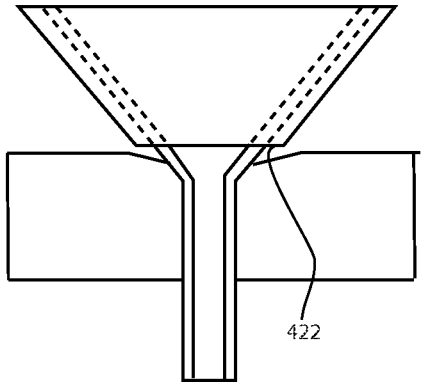
Figure 4M:
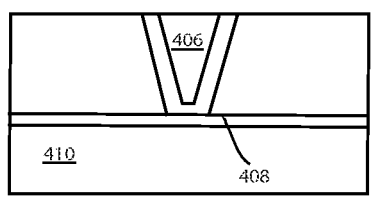
Figure 4N:
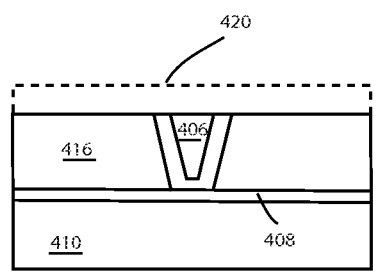
Figure 4G:
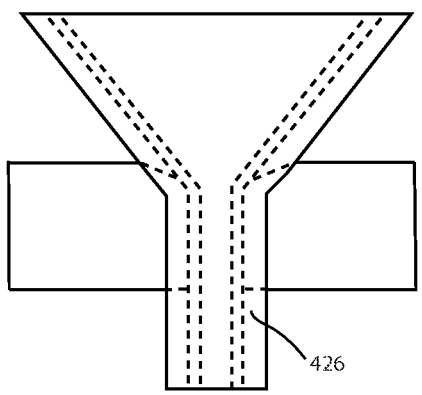
Figure 4H:
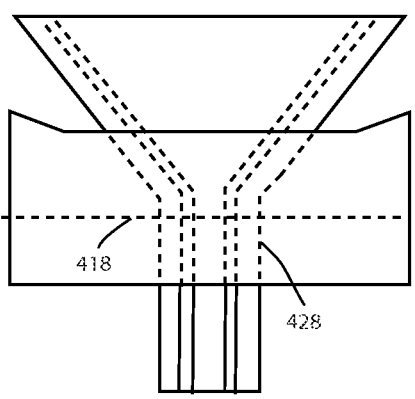
Figure 4O:
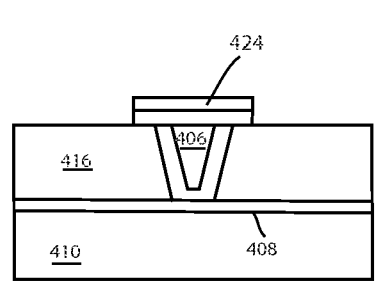
Figure 4P:
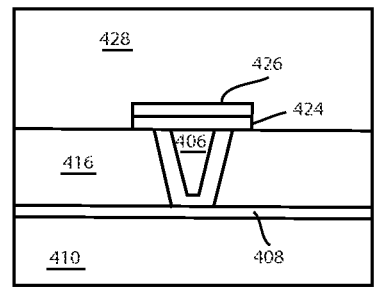

FIGS. 4A-4H are schematic top views of a write head at various states of production. FIGS. 4I-4P are schematic cross sectional views of FIGS. 4A-4H respectively. FIGS. 4A-4P shows an example of a process flow to form the conformal side gap, side shield, trailing gap, high Bs seed, and trailing shield. An example of a structure that may be fabricated by the process described with reference to FIGS. 4A-4P is the structure shown in FIG. 1A.

An insulating layer 402 is formed over a first leading edge shield layer 410 and a second leading edge shield layer 408. A trench is etched into the insulating layer 402. The trench is then filled with a non-magnetic seed layer 404 and then a magnetic layer 406. In one embodiment, the insulating layer 402 may comprise alumina. In one embodiment, the non-magnetic seed layer 404 may comprise ruthenium. In another embodiment, the non-magnetic seed layer 404 may comprise iridium. In one embodiment, the magnetic layer 406 may comprise a ferromagnetic material. In another embodiment, the magnetic layer 406 may comprise iron, nickel, cobalt, or combinations thereof. A photoresist mask 412 may then be formed over the insulating layer 402, magnetic layer 406, and non-magnetic layer 404. The exposed insulating layer 402 may be removed by a reactive ion etching process. Thereafter, the remaining insulating layer 402 may be removed by a wet etching process. In one embodiment, the reactive ion etching process may be eliminated and the insulating layer 402 may be removed by wet etching.

A magnetic seed layer 414 may then be deposited over the exposed second leading edge shield layer 408, the non-magnetic layer 404, and the magnetic layer 406. In one embodiment, the magnetic seed layer 414 may comprise a ferromagnetic material. In another embodiment, the magnetic seed layer 414 may comprise a material selected from the group consisting of iron, cobalt, nickel, and combinations thereof. The magnetic seed layer 414 may be deposited by sputtering.

After the magnetic seed layer 414 is deposited, a photoresist mask may be formed and a magnetic layer 416, which will be the side shield, will be electroplated onto the exposed portions of the magnetic seed layer 414. The photoresist mask may then be removed and the exposed portions of the magnetic seed layer 414 may be removed by milling. The magnetic layer 416 and the first leading edge shield layer 410 are now magnetically connected. In one embodiment, the magnetic layer 416 may comprise a ferromagnetic material. In another embodiment, the magnetic layer 416 may comprise iron, nickel, cobalt, or combinations thereof. In another embodiment, the magnetic layer 416 is selected from the group consisting of NiFe and CoNiFe. In another embodiment, the magnetic layer 416 may have a magnetic flux density of between about 1.0 Tesla and about 1.3 Tesla.

The magnetic layer 416 and magnetic seed layer 414 may then be polished back using a CMP process. The ABS 418 is shown by the dashed line. The seed layer 404 acts as a CMP stop. In order to enhance uniformity, an additional CMP stop layer such as ruthenium, iridium, rhodium, or diamond like carbon may be used in the area surrounding the yoke and the plated side shield. The tapered pole is then formed by ion milling. A mask, such as a resist mask or hard mask is to mask the areas of the structure that will not be tapered. The portions that are removed are shown in dashed form by numeral 420. The portions that are not removed create a trailing edge taper (TET) bump 422. In one embodiment, the mask comprises silicon carbide. In another embodiment, the hard mask comprises alumina.

The write gap layer 424 and high Bs seed layer 426 may then be deposited and patterned by photolithography and milling. The write gap 424 may comprise a non-magnetic material. In one embodiment, the write gap 424 may comprise oxides such as alumina or ruthenium. In one embodiment, the high Bs layer 426 may comprise a ferromagnetic material, such as CoFe or CoNiFe. In another embodiment, the high Bs layer 426 may have a magnetic flux density of between about 2.3 Tesla and about 2.4 Tesla. The high Bs layer 426 over the write gap layer 424 enhances the field gradient and helps improve the BER. The trailing edge shield 428 may then be pattered by seed layer deposition, lithography, electroplating, and seed milling. In one embodiment, the trailing edge shield 428 may comprise a ferromagnetic material. In another embodiment, the trailing edge shield 428 may comprise NiFe or CoNiFe. In one embodiment, the trailing edge shield 428 may have a magnetic flux density of between about 1.2 Tesla and about 2.4 Tesla.

Figure 5E:
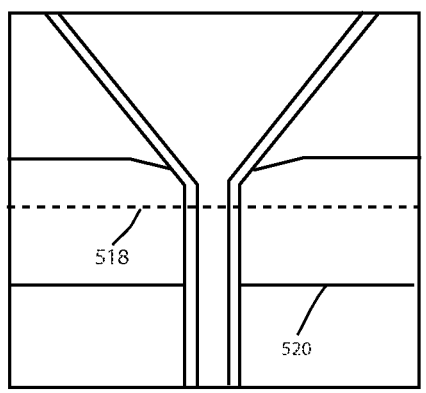
Figure 5F:
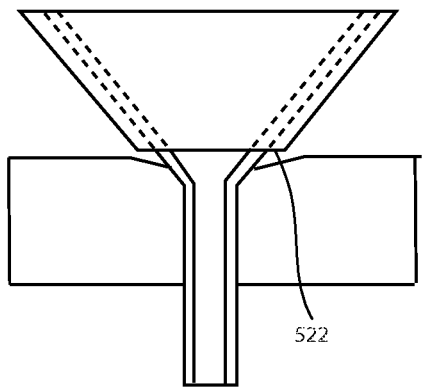
Figure 5M:
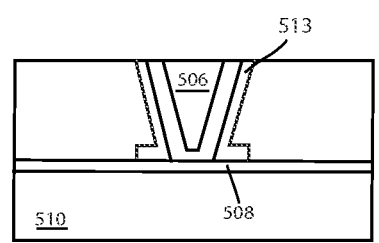
Figure 5N:
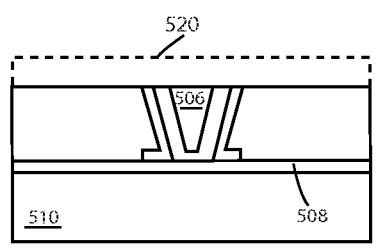
Figure 5G:
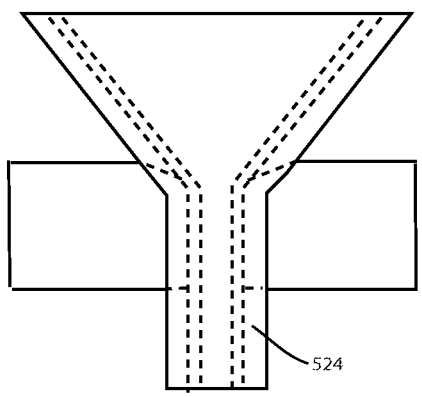
Figure 5H:
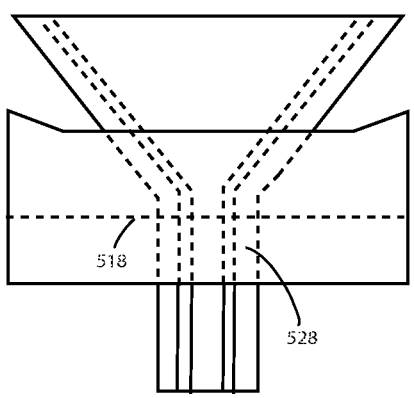
Figure 5O:
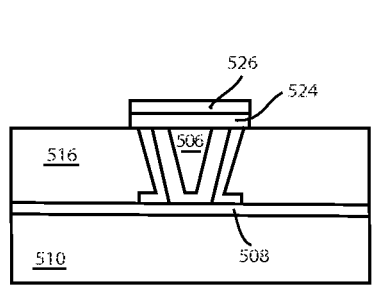
Figure 5P:
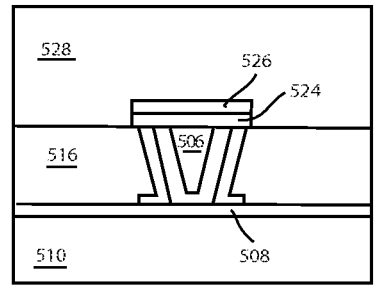

FIGS. 5A-5H are schematic top views of a write head at various states of production according to another embodiment. FIGS. 5I-5P are schematic cross sectional views of FIGS. 5A-5H respectively. FIGS. 5A-5P show another examples of a process flow to form a conformal side gap, side shield, trailing gap, high Bs seed layer, and trailing shield. Write heads such as those shown in FIG. 1B may be fabricated by the process flow shown in FIGS. 5A-5P.

An insulating layer 502 is formed over a first leading edge shield layer 510 and a second leading edge shield layer 508. A trench is etched into the insulating layer 502. The trench is then filled with a non-magnetic seed layer 504 and then a magnetic layer 506. In one embodiment, the insulating layer 502 may comprise alumina. In one embodiment, the non-magnetic seed layer 504 may comprise ruthenium. In another embodiment, the non-magnetic seed layer 504 may comprise iridium. In one embodiment, the magnetic layer 506 may comprise a ferromagnetic material. In another embodiment, the magnetic layer 506 may comprise iron, nickel, cobalt, or combinations thereof. A photoresist mask 512 may then be formed over the insulating layer 502, magnetic layer 506, and non-magnetic layer 504. The exposed insulating layer 502 may be removed by a reactive ion etching process. Thereafter, the remaining insulating layer 502 may be removed by a wet etching process. In one embodiment, the reactive ion etching process may be eliminated and the insulating layer 502 may be removed by wet etching. Thereafter, the photoresist mask 512 may be removed.

A non-magnetic seed layer 513 may then be deposited. In one embodiment, the non-magnetic seed layer 513 may comprise ruthenium. In another embodiment, the non-magnetic layer 513 may comprise $Al_2O_3$. The non-magnetic seed layer 513 may be deposited by sputtering. The non-magnetic seed layer 513 may then be patterned. The non-magnetic seed layer 513 becomes a part of the side gap and also acts as a CMP stop layer in later processing. The total thickness of the side gap will be the sum of the non-magnetic layer 504 thickness deposited inside the trench and the non-magnetic seed layer 513 deposited outside the trench. In one embodiment, the side gap thickness may be between about 70 nm and about 100 nm. In one embodiment, the non-magnetic seed layer 513 may have a thickness of between about 30 nm and about 50 nm. In another embodiment, the non-magnetic layer 504 may have a thickness of between about 20 nm and about 50 nm. The non-magnetic seed layer 513 may be deposited by a conformal deposition process such as atomic layer chemical vapor deposition. After the non-magnetic seed layer 513 is deposited, the non-magnetic seed layer 513 may be patterned by photolithography and ion milling. A small portion of the non-magnetic seed layer 513 remains at the ABS between the side shield and the second leading edge shield layer 508. The impact of the small portion is negligible when the thickness is less than 50 nm for a tail length of up to about 500 nm.

A magnetic seed layer may then be deposited over the exposed second leading edge shield layer 508 and the non-magnetic seed layer 513. In one embodiment, the magnetic seed layer may comprise a ferromagnetic material. In another embodiment, the magnetic seed layer may comprise a material selected from the group consisting of iron, cobalt, nickel, and combinations thereof. The magnetic seed layer may be deposited by sputtering.

After the magnetic seed layer is deposited, a photoresist mask may be formed and a magnetic layer 516, which will be the side shield, will be electroplated onto the exposed portions of the magnetic seed layer (if present). The photoresist mask may then be removed and the exposed portions of the magnetic seed layer may be removed by milling. The magnetic layer 516 and the first leading edge shield layer 510 are now magnetically connected. In one embodiment, the magnetic layer 516 may comprise a ferromagnetic material such as iron, nickel, cobalt, or combinations thereof. In a particular embodiment, the magnetic layer 516 is selected from the group consisting of NiFe and CoNiFe. In another embodiment, the magnetic layer 516 may have a magnetic flux density of between about 1.0 Tesla and about 1.8 Tesla.

The magnetic layer 516 and magnetic seed layer may then be polished back using a CMP process. The ABS 518 is shown by the dashed line. The non-magnetic layer 513 acts as a CMP stop which will provide excellent pole thickness uniformity. In order to enhance uniformity, an additional CMP stop layer such as ruthenium, iridium, rhodium, or diamond like carbon may be used in the area surrounding the yoke and the plated side shield. The tapered pole is then formed by ion milling. A mask, such as a resist mask or hard mask is to mask the areas of the structure that will not be tapered. The portions that are removed are shown in dashed form by numeral 520. The portions that are not removed create a trailing edge taper (TET) bump 522. In one embodiment, the mask comprises silicon carbide. In another embodiment, the hard mask comprises alumina.

The write gap layer 524 and high Bs seed layer 526 may then be deposited and patterned by photolithography and milling. The write gap 524 may comprise a non-magnetic material. In one embodiment, the write gap 524 may comprise oxides such as alumina or ruthenium oxide. In one embodiment, the high Bs layer 526 may comprise a ferromagnetic material. In another embodiment, the high Bs layer 526 may comprise CoFe or CoNiFe. In another embodiment, the high Bs layer 526 may have a magnetic flux density of between about 2.3 Tesla and about 2.4 Tesla. The high Bs layer 526 over the write gap layer 524 enhances the field gradient and helps improve the BER. The trailing edge shield 528 may then be pattered by seed layer deposition, lithography, electroplating, and seed milling. In one embodiment, the trailing edge shield 528 may comprise a ferromagnetic material. In another embodiment, the trailing edge shield 528 may comprise NiFe or CoNiFe. In one embodiment, the trailing edge shield 528 may have a magnetic flux density of between about 1.2 Tesla and about 2.4 Tesla.

Because the leading edge shield is chemical mechanical polished down to a level that is substantially even with a chemical mechanical polishing stop layer, the gap layer may be conformally deposited. In so doing, the conformal side shield is magnetically connected with the leading edge shield which will improve the device performance.

While the foregoing is directed to embodiments of the present invention, other and further embodiments of the invention may be devised without departing from the basic scope thereof, and the scope thereof is determined by the claims that follow.

What is claimed is:

1. A method of manufacturing a write head, comprising:
removing at least a portion of a first leading edge shield layer to expose a stop layer;
depositing a second leading edge shield layer over the first leading edge shield layer and the exposed stop layer; and
removing at least a portion of the second leading edge shield layer to form a tapered second leading edge shield layer and to expose the stop layer.

2. The method of claim 1, wherein the stop layer is selected from the group consisting of ruthenium, iridium, and combinations thereof.

3. A method of manufacturing a write head, comprising:
removing at least a portion of a first leading edge shield layer to expose a stop layer;
depositing a second leading edge shield layer over the first leading edge shield layer and the exposed stop layer;
removing at least a portion of the second leading edge shield layer to form a tapered second leading edge shield layer and to expose the stop layer;
depositing an insulating layer over the stop layer and the second leading edge shield layer;

etching a trench into the insulating layer;
depositing a non-magnetic seed layer within the trench;
depositing a first magnetic layer over the insulating layer and over the non-magnetic seed layer within the trench;
removing the insulating layer to expose the second leading edge shield layer;
depositing a magnetic seed layer over the second leading edge shield and the first magnetic layer;
depositing a second magnetic layer over the magnetic seed layer;
chemical mechanical polishing the second magnetic layer;
depositing a write gap layer over the second magnetic layer;
depositing a seed layer over the write gap layer;
patterning the write gap layer and the seed layer; and
depositing a trailing edge shield layer over the seed layer and the second magnetic layer.

4. The method of claim 3, wherein the write gap layer is conformally deposited over the second magnetic layer.

5. A method of manufacturing a write head, comprising:
removing at least a portion of a first leading edge shield layer to expose a stop layer;
depositing a second leading edge shield layer over the first leading edge shield layer and the exposed stop layer;
removing at least a portion of the second leading edge shield layer to form a tapered second leading edge shield layer and to expose the stop layer;
depositing an insulating layer over the stop layer and the second leading edge shield layer;
etching a trench into the insulating layer;
depositing a first non-magnetic seed layer within the trench;
depositing a first magnetic layer over the first non-magnetic seed layer within the trench;
removing the insulating layer to expose the second leading edge shield layer;
depositing a second non-magnetic seed layer over the second leading edge shield layer, the first non-magnetic seed layer and the first magnetic layer;
patterning the second non-magnetic seed layer;
depositing a second magnetic layer;
polishing the second magnetic layer to expose the second non-magnetic seed layer;
depositing a write gap layer over the second non-magnetic seed layer;
depositing a seed layer over the write gap layer;
patterning the write gap layer and the seed layer; and
depositing a trailing edge shield layer over the seed layer and the second magnetic layer.

6. A method of manufacturing a write head, comprising:
removing at least a portion of a first leading edge shield layer to expose a stop layer;
depositing a second leading edge shield layer over the first leading edge shield layer and the exposed stop layer; and
removing at least a portion of the second leading edge shield layer to form a tapered second leading edge shield layer and to expose the stop layer, wherein the first leading edge shield layer and the stop layer are substantially planar after removing at least a portion of the first leading edge shield layer.

7. A method of manufacturing a write head, comprising:
forming a first insulating material over a substrate;
depositing a stop layer over the substrate and the first insulating material;
depositing a first leading edge shield layer over the stop layer;
chemical mechanical polishing the first leading edge shield layer to expose the stop layer;
depositing a second leading edge shield layer over the first leading edge shield layer and the exposed stop layer;
removing at least a portion of the second leading edge shield layer to form a tapered second leading edge shield layer and to expose the stop layer;
depositing a second insulating layer over the stop layer and the second leading edge shield layer; and
chemical mechanical polishing the second insulating layer.

8. The method of claim 7, further comprising:
etching a trench into the second insulating layer;
depositing a non-magnetic seed layer within the trench;
depositing a first magnetic layer over the second insulating layer and over the non-magnetic seed layer within the trench;
removing the second insulating layer to expose the second leading edge shield layer;
depositing a magnetic seed layer over the second leading edge shield and the second magnetic layer;
depositing a second magnetic layer over the magnetic seed layer;
chemical mechanical polishing the second magnetic layer;
depositing a write gap layer over the second magnetic layer;
depositing a seed layer over the write gap layer;
patterning the write gap layer and the seed layer;
depositing a trailing edge shield layer over the seed layer and the second magnetic layer.

9. The method of claim 8, wherein the write gap layer has at least a portion that is tapered.

10. The method of claim 7, further comprising:
etching a trench into the second insulating layer;
depositing a first non-magnetic seed layer within the trench;
depositing a first magnetic layer over the first non-magnetic seed layer within the trench;
removing the second insulating layer to expose the second leading edge shield layer;
depositing a second non-magnetic seed layer over the second leading edge shield layer, the first non-magnetic seed layer and the first magnetic layer;
patterning the second non-magnetic seed layer;
depositing a second magnetic layer;
polishing the second magnetic layer to expose the second non-magnetic seed layer;
depositing a write gap layer over the second non-magnetic seed layer;
depositing a seed layer over the write gap layer;
patterning the write gap layer and the seed layer;
depositing a trailing edge shield layer over the seed layer and the third magnetic layer.

11. The method of claim 10, wherein the write gap layer has at least a portion that is tapered.

12. A method of manufacturing a write head, comprising:
depositing a first magnetic layer over a substrate;
patterning the first magnetic layer to expose the substrate;
depositing a first insulating layer over the exposed substrate and the first magnetic layer;
chemical mechanical polishing the first insulating layer to expose the first magnetic layer;
removing at least a portion of the first magnetic layer to expose the substrate;
depositing a stop layer over the substrate and the first insulating layer;
depositing a first leading edge shield layer over the stop layer;

chemical mechanical polishing the first leading edge shield layer to expose the stop layer;
depositing a second leading edge shield layer over the first leading edge shield layer and the exposed stop layer;
forming a resist mask over the second leading edge shield layer;
milling the second leading edge shield layer to form a tapered second leading edge shield layer and to expose the stop layer;
removing the resist mask:
depositing a second insulating layer over the stop layer and the second leading edge shield layer; and
chemical mechanical polishing the second insulating layer.

13. The method of claim 12, wherein the stop layer is selected from the group consisting of ruthenium, iridium, and combinations thereof.

14. The method of claim 13, wherein the stop layer is deposited by sputtering.

15. The method of claim 12, wherein the first insulating layer and the second insulating layer each comprise alumina.

16. The method of claim 15, wherein the first leading edge shield layer and the second leading edge shield layer each comprise nickel-iron.

17. The method of claim 12, further comprising:
etching a trench into the second insulating layer;
depositing a non-magnetic seed layer within the trench;
depositing a second magnetic layer over the non-magnetic seed layer within the trench;
removing the second insulating layer to expose the second leading edge shield layer;
depositing a magnetic seed layer over the second leading edge shield and the second magnetic layer;
depositing a third magnetic layer over the magnetic seed layer;
chemical mechanical polishing the third magnetic layer;
depositing a write gap layer over the third magnetic layer;
depositing a seed layer over the write gap layer;
patterning the write gap layer and the seed layer;
depositing a trailing edge shield layer over the seed layer and the third magnetic layer.

18. The method of claim 17, wherein the write gap layer has at least a portion that is tapered.

19. The method of claim 12, further comprising:
etching a trench into the second insulating layer;
depositing a first non-magnetic seed layer within the trench;
depositing a second magnetic layer over the first non-magnetic seed layer within the trench;
removing the second insulating layer to expose the second leading edge shield layer;
depositing a second non-magnetic seed layer over the second leading edge shield layer, the first non-magnetic seed layer and the second magnetic layer;
patterning the second non-magnetic seed layer;
depositing a third magnetic layer;
patterning the third magnetic layer to expose the second non-magnetic seed layer;
depositing a write gap layer over the second non-magnetic seed layer;
depositing a seed layer over the write gap layer;
patterning the write gap layer and the seed layer;
depositing a trailing edge shield layer over the seed layer and the third magnetic layer.

20. The method of claim 19, wherein the write gap layer has at least a portion that is tapered.

* * * * *